United States Patent
Ricco et al.

(10) Patent No.: US 6,904,896 B2
(45) Date of Patent: Jun. 14, 2005

(54) TANK FOR A SYSTEM FOR SUPPLYING LIQUID FUEL, PARTICULARLY LPG, TO THE ENGINE OF A MOTOR VEHICLE

(75) Inventors: Mario Ricco, Casamassima (IT); Sisto Luigi De Matthaeis, Modugno (IT); Claudio Amorese, Corato (IT); Onofrio De Michele, Castellana Grotte (IT); Annunziata Anna Satriano, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/773,310

(22) Filed: Feb. 9, 2004

(65) Prior Publication Data

US 2004/0182452 A1 Sep. 23, 2004

(30) Foreign Application Priority Data

Feb. 11, 2003 (IT) .................................... TO2003A0096

(51) Int. Cl.[7] ............................................. F02M 37/04

(52) U.S. Cl. ...................................... 123/509; 123/514
(58) Field of Search ................................ 123/509, 495, 123/497, 446, 514; 137/565, 34, 576; 220/562–564

(56) References Cited

U.S. PATENT DOCUMENTS

| | | | |
|---|---|---|---|
| 6,192,918 B1 * | 2/2001 | Jaasma et al. | 137/382 |
| 6,302,144 B1 * | 10/2001 | Graham et al. | 137/565.17 |
| 6,305,417 B1 * | 10/2001 | Kleppner et al. | 137/565.34 |
| 6,517,327 B2 * | 2/2003 | Beyer et al. | 417/363 |
| 6,655,365 B2 * | 12/2003 | Beyer et al. | 123/509 |
| 6,708,673 B2 * | 3/2004 | Herzog et al. | 123/509 |
| 6,805,104 B2 * | 10/2004 | Ricco et al. | 123/495 |

* cited by examiner

Primary Examiner—Mahmoud Gimie
(74) Attorney, Agent, or Firm—Sughrue Mion, PLLC

(57) ABSTRACT

An LPG fuel tank for motor vehicles is provided, inside, with a support, on which there can be installed in a rapid way a pump assembly including a supply pump and the corresponding electric actuating motor. Preferably, the support is also used for installing a level-sensor assembly within the tank.

7 Claims, 5 Drawing Sheets

Fig_4

TANK FOR A SYSTEM FOR SUPPLYING LIQUID FUEL, PARTICULARLY LPG, TO THE ENGINE OF A MOTOR VEHICLE

BACKGROUND OF THE INVENTION

The present invention relates to systems for supplying liquid fuel, in particular LPG, to the engines of motor vehicles.

The systems of the type specified above typically comprise a liquid-fuel tank, a plurality of injectors associated to the cylinders of the engine for injecting the fuel in the liquid state into said cylinders, a manifold or rail for supplying the liquid fuel to said injectors, a pipe for the supply of the liquid fuel from the tank to the aforesaid rail, a return pipe for taking the LPG supplied in excess to the injectors back to the tank, a pump submersed in the liquid fuel present in the tank for supplying the liquid fuel through the delivery pipe, and an electric motor for controlling the pump.

LPG supply systems of the type referred to above are, for example, described in the European patent No. EP-B-0 725 205 and in the European patent No. EP-B-0 922 851 in the name of the present applicant, as well as in the corresponding U.S. Pat. No. 5,592,924 and U.S. Pat. No. 6,050,237.

SUMMARY OF THE INVENTION

The purpose of the present invention is to provide a tank for a supply system of the type specified above that may be assembled and installed with simple and rapid operations and that will moreover enable operations of maintenance and/or replacement of the components arranged within the tank to be carried out in a simple and rapid way.

With a view to achieving said purpose, the subject of the present invention is a tank for a system for supplying liquid fuel, particularly LPG, to the engine of a motor vehicle, comprising a pump assembly set within the tank, including a pump for suctioning the liquid fuel contained within the tank and feeding it to a pipe for supply of the liquid fuel, and an electric motor for actuating the pump, characterized in that the pump assembly is installed by means of fast-connection means on a support fixed within the tank.

According to a further characteristic, the aforesaid support defines a seat for receiving the pump assembly and is provided with fast-clamping means for clamping the assembly within said seat.

In a preferred embodiment, the aforesaid support is also used for supporting a level-sensor device that is also set within the tank.

Thanks to the characteristics described above, the pump assembly, after being pre-assembled, can be installed, with simple and rapid operations, within the tank. Tanks of this type typically have an opening that is closed by a flange carrying the various connectors for electrical and hydraulic connection of the components arranged within the tank to the external electrical and hydraulic circuits. The aforesaid opening can be used for inserting the pump assembly within the tank. Thanks to the invention, the assembly can be anchored to the tank in a simple and rapid way, without any need for laborious operations of connection. Said simplicity of assembly is reflected also in an ease and rapidity of removal of the pump assembly from the tank, for possible replacement or maintenance.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF THE INVENTION

Figure 1:
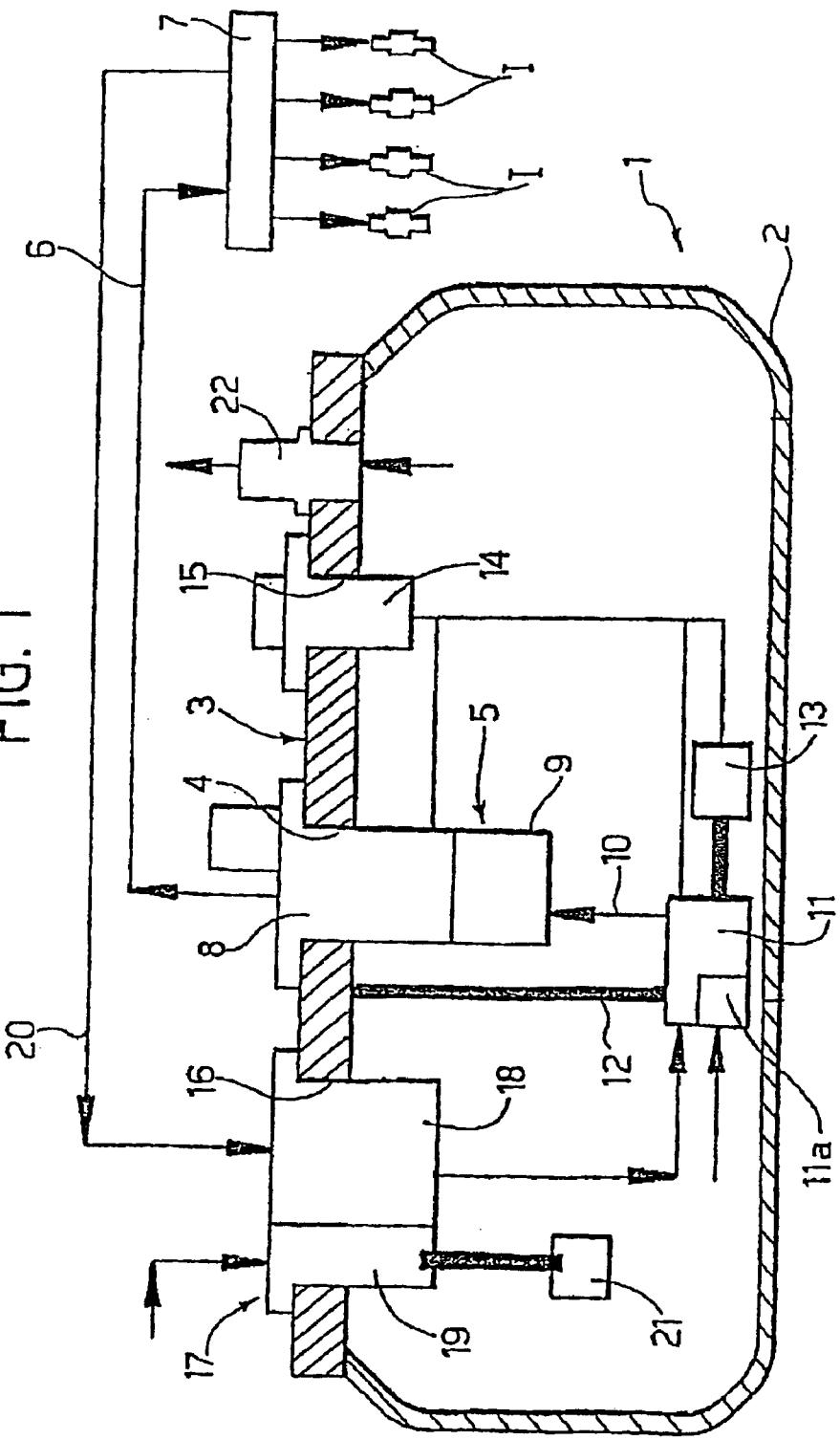
FIG. 1 is a schematic view of a system for supplying LPG to the engine of a motor vehicle.

In FIG. 1, the reference number 1 designates as a whole an LPG fuel tank built according to the known art, for supplying the LPG to a plurality of injectors I associated to the various cylinders of the engine. The tank 1 has a hollow structure 2 built so as to guarantee tightness at the working pressures expected for a system of the type in question. The hollow structure 2 has a top opening closed by a service flange 3 carrying the various fitting and connection elements for connection of the tank to the supply system. For this purpose, the tank 1 has a first through opening 4, through which there is installed the structure of an assembly 5 connected to a line 6 for delivery of the LPG to a distribution manifold or rail 7, which distributes the LPG between the various injectors I. The assembly 5 includes a shut-off solenoid valve 8 designed to close, interrupting communication of the tank with the outside environment in pre-determined emergency conditions, as well as a flow-limiting valve 9. The assembly 5 receives the LPG through the line 10 from the pump 11 driven by an electric motor 11a, the structure of which is connected by means of a connection element 12 to the service flange 3. The assembly of the pump 11 may in any case be obtained in any other way, as will be indicated also in what follows. To the structure of the pump 11 there is moreover connected the structure of a sensor device 13 for detecting the level of LPG. The electrical supply of the solenoid valve 8, of the pump 11, and of the sensor 13 is guaranteed by an electrical connector 14 that is mounted through a through opening 15 of the service flange 3. The latter moreover has a further through opening 16, within which there is installed an assembly 17 including two valves 18 and 19. The valve 18 is a return valve, which is connected to a line 20 for flow back into the tank of the LPG supplied in excess to the rail 7. The valve 19 is the valve used for filling the tank and is associated to a further level-sensor 21. Associated to the flange 3 is moreover a safety valve 22, which prevents the pressure within the tank from exceeding a pre-determined threshold value.

FIG. 1 shows a traditional embodiment of tank, in which the flange 3 has through holes traversed by the various components described above. The present invention could also be made with a tank having an innovative structure that has formed the subject of the preceding Italian patent application No. TO2001A000360 in the name of the present applicant, in which at least some of the aforesaid components are fixed to the bottom surface of the plate, without passing through it. Furthermore, as already mentioned, in the case of the invention operation of the electric motor 11a is not controlled by a level-sensor 13, but rather by the innovative means that will be described in what follows. Finally, also installation of the engine-pump assembly, in the preferred embodiment of the invention, is different from what is indicated purely by way of example in FIG. 1, with reference to the known art.

Figure 2:
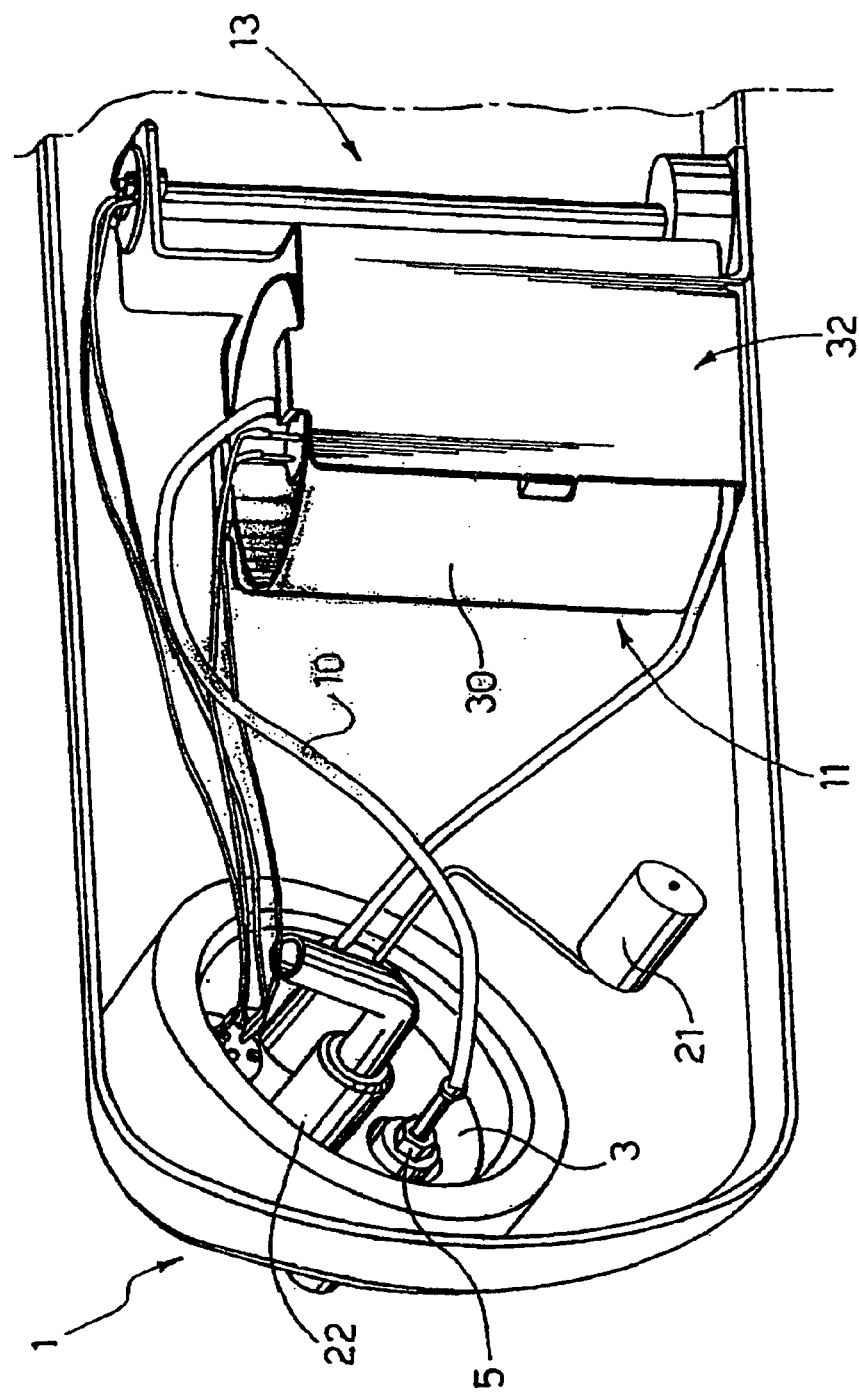
FIG. 2 is a sectioned perspective view of an embodiment of the tank according to the invention.

FIGS. 2 to 5 illustrates a preferred embodiment of an LPG tank according to the invention. In FIG. 2, the parts corresponding to the ones illustrated in FIG. 1 are designated by the same reference numbers. In the case of the tank according to the invention, the pump assembly, comprising the supply pump 11 for delivering the LPG and the corresponding electric actuating motor 11a, is set within a cylindrical container 30. Said container guarantees that the part of liquid in which the pump assembly is submersed is as little as possible subject to shaking when the motor vehicle on which the tank is installed is in motion. The said pump assembly is in itself of a known type and is not therefore illustrated in detail in the annexed drawings. It can be built according to any conventional technique. The basic idea of the invention lies in the fact that the pump assembly can be installed and removed rapidly for the reason that it is received in a seat 31 (see, for example, FIG. 4) defined by a support made of metal plate 32, which is welded on the bottom of the tank 1.

In the example illustrated, the support made of metal sheet 32 is made of a single piece by means of bending, starting from a plane metal plate, so as to define (see FIGS. 3–5) a central vertical wall 32A, two side vertical walls 32B, two horizontal bottom flanges 32C projecting from the bottom edges of the side walls 32B and which define a bottom supporting surface for the pump assembly 11 with the corresponding container 30, and two top horizontal flanges 32D which project from the top edges of the vertical walls 32B and define a top plane for containment of the pump assembly.

Figure 3:
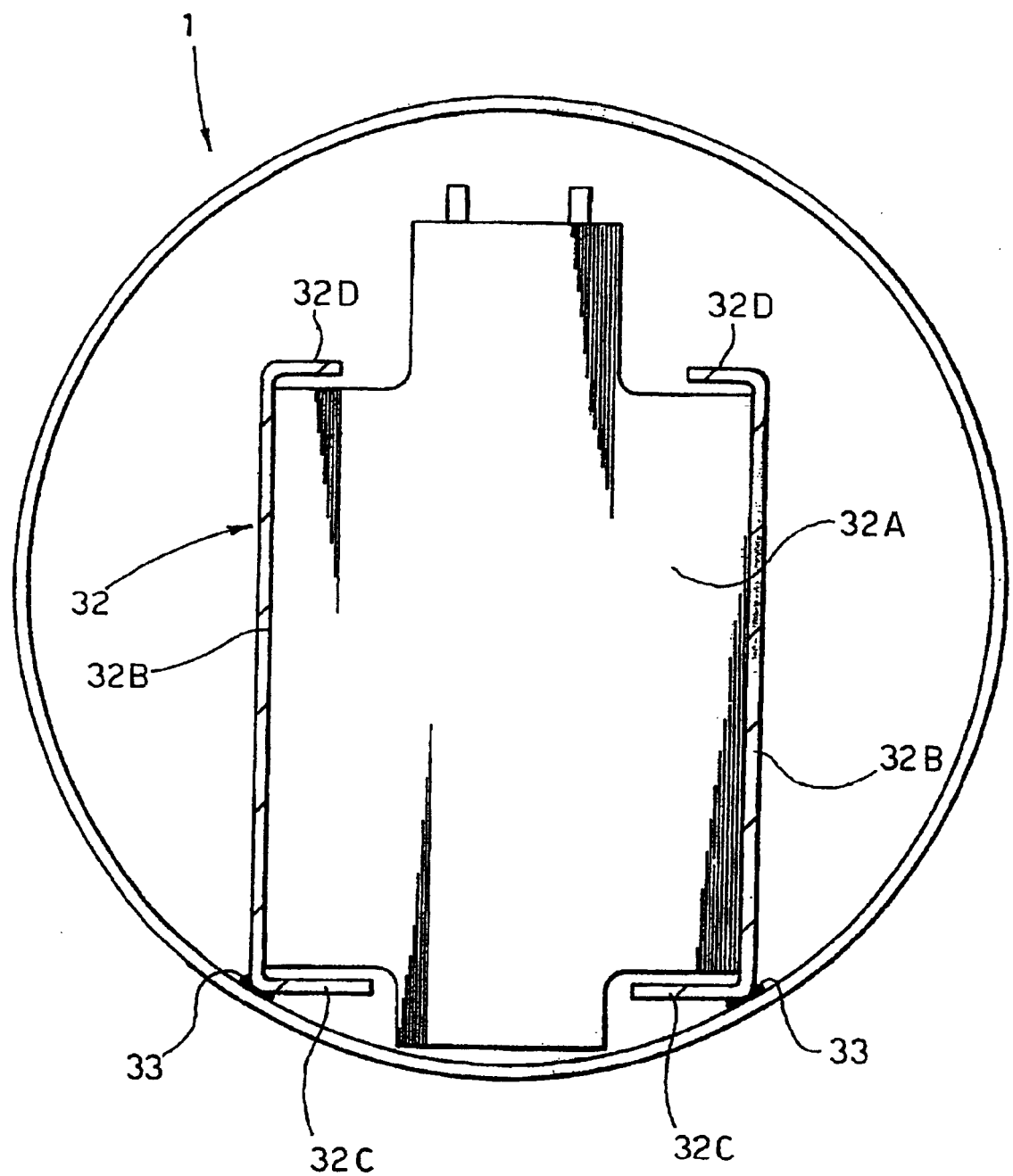
FIG. 3 is a cross-sectional view of the tank of FIG. 2.
Figure 4:
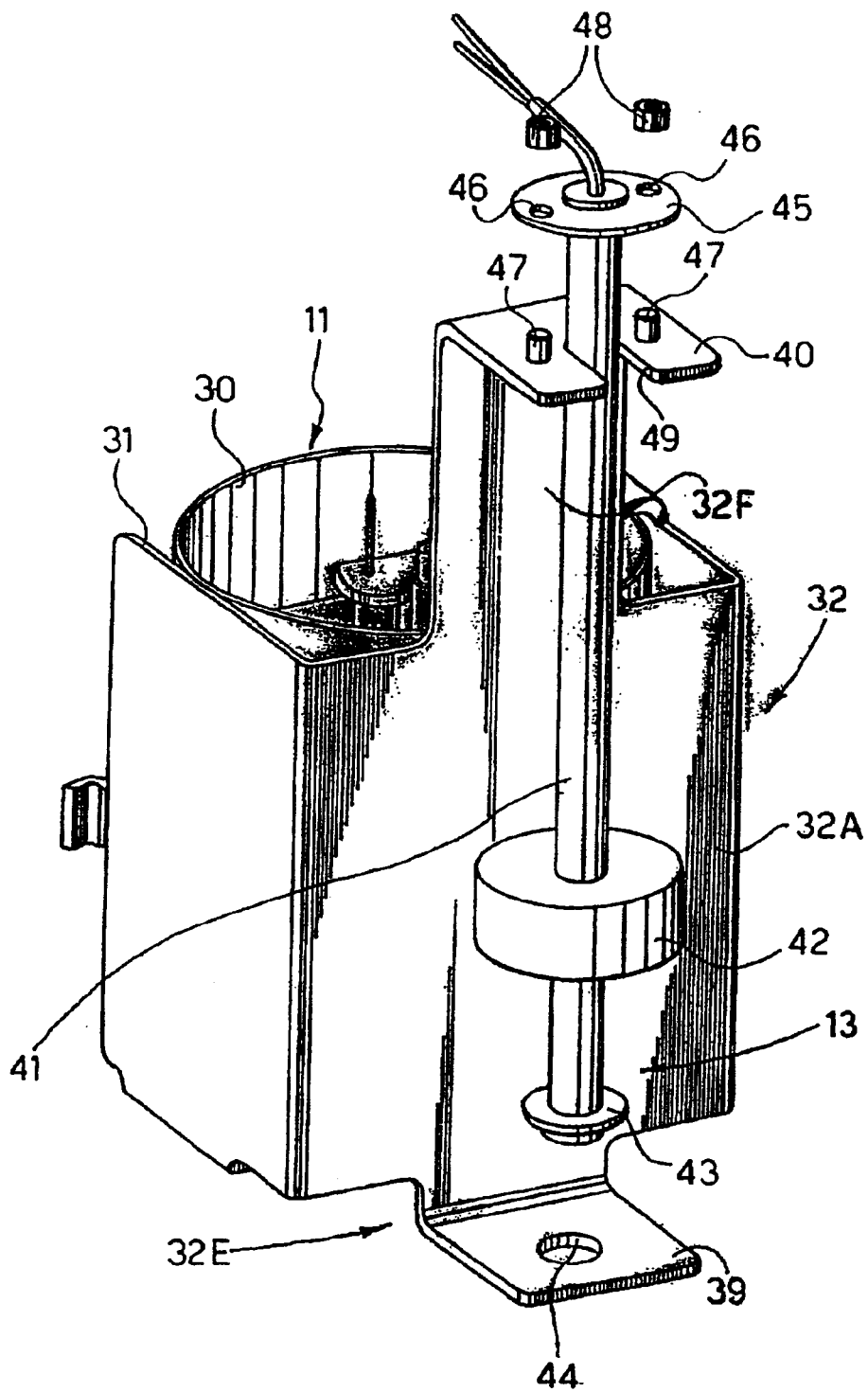
FIGS. 4 and 5 are two perspective views of a detail of FIG. 2.
Figure 5:
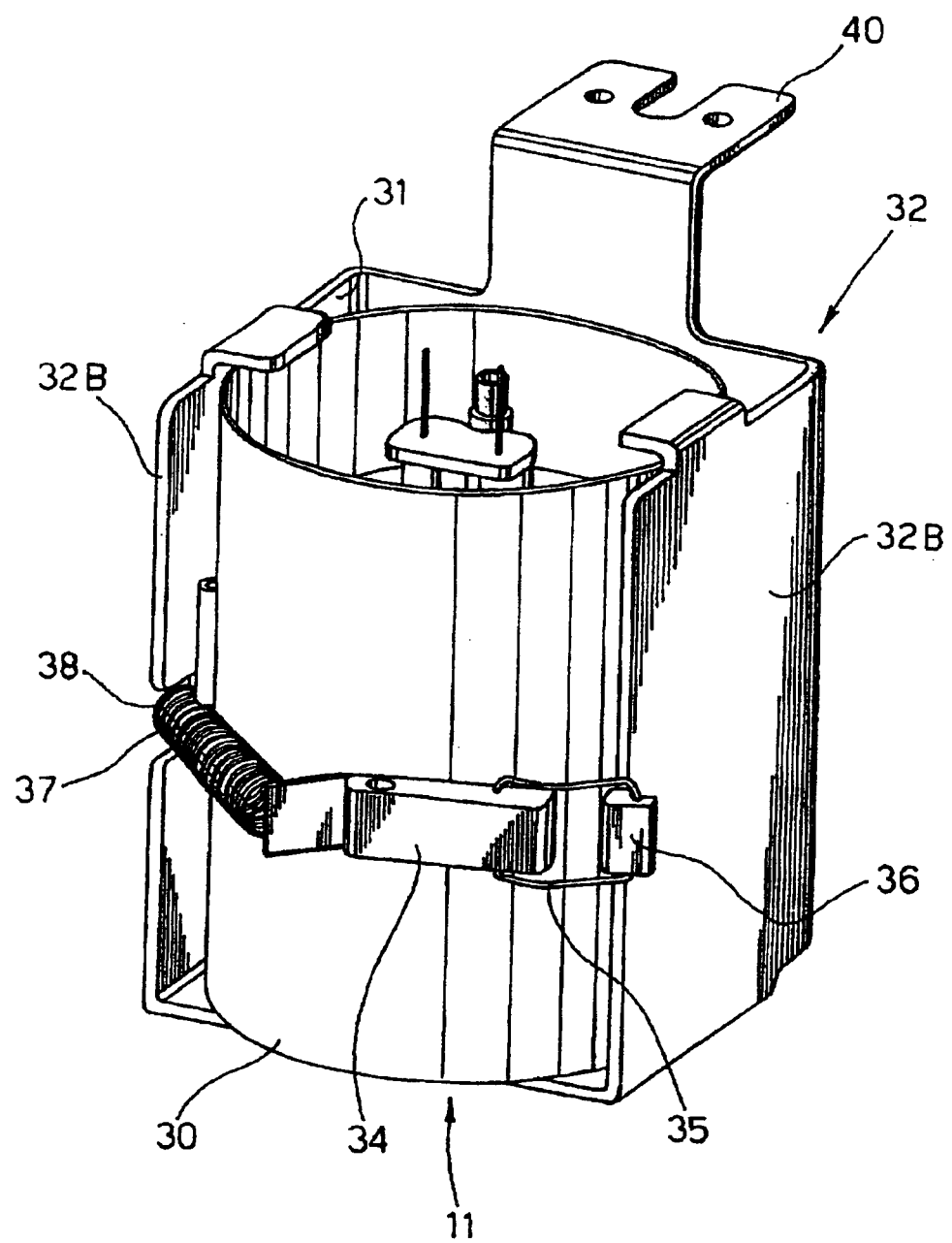

As may be seen in FIG. 3, the support 32 is fixed on the bottom of a tank 1, which has a substantially cylindrical conformation and is designed to be set horizontally. The sharp bottom edges of the side walls 32B of the support 32 are tangential to the internal surface of the tank, which has a circular cross section, and are joined thereto by means of welded joints 33.

As may be seen in the drawings, the pump assembly 11, including also the external cylindrical container 30, is received in the seat 31 defined by the support 32 and clamped in said position by means of a retention member consisting of a plate made of metal material or plastic material 34, provided at one end with a buckle 35 hooked on a tooth 36 projecting from one of the two side walls 32B. The opposite end of the plate 34 is instead connected by means of a helical spring 37 to the other side wall 32B, in which a notch 38 is formed that receives the corresponding end of the spring 37.

In the preferred embodiment, the central wall 32A has a bottom portion 32E with a horizontal plane appendage 39. Furthermore, the central wall 32A has, at the top, a vertical portion 32F terminating in a horizontal plane appendage 40, in a position set opposite to the appendage 39. The appendages 39, 40 function as supports for a level-sensor assembly 13, which, in the example illustrated, is built in conformance with a co-pending patent application in the name of the present applicant. According to said solution, the level-sensor assembly has a vertical column 41 fixed at its end to the two appendages 39, 40 and a float, in the form of an annular body 42, installed in a slidable way, with play, on the vertical column 41. According to the teachings specified in the co-pending patent application in the name of the present applicant that has already been cited, within the column 41 there is provided a vertical aligned series of reed relays that are activated selectively by permanent magnets incorporated in the float 42 and that consequently are able to issue at output an electrical signal that depends upon of the position of the float 42 with respect to the column 41. As already said, the structure and the conformation of the level-sensor form in themselves a subject of a separate patent application. For the purposes of the present invention, said device is in any case advantageous in so far as it enables the same support 32, to which the pump assembly is anchored, to be used also for supporting the level- sensor assembly. Obviously, it would likewise be possible to adopt a support for anchorage of the pump assembly, without envisaging an anchorage thereon also of the level-sensor assembly. Furthermore, for the purposes of the present invention, the level-sensor assembly could be even altogether different from what is illustrated herein with reference to the preferred embodiment of the invention.

Once again with reference to said preferred example, the column 41 of the level-sensor assembly has, at the bottom, an end disk 43, which rests on the surface of the bottom appendage 39, which has a hole 44 for centring of the column 41. Likewise, the top end of the column 41 is provided with a top disk 45 with two holes 46 set diametrically opposite to one another, which are engaged on threaded grub-screws 47 that project from the appendage 40 and receive lock-nuts 48 (see FIG. 4). Once again with reference to the drawings, the appendage 40 has a notch 49 for engagement and installation of the column 41 of the level-sensor assembly.

In installation of the tank according to the invention, the pump assembly is installed within the tank after the support 32 has already been welded in the way described on the bottom of the latter. The pump assembly is introduced through the opening, which is closed during normal operation by the flange 3. The pump assembly is set in the seat 31 defined by the support 32 and clamped there by means of the retention member consisting of the plate 34 with the hook 35 and the spring 37. Also the level-sensor assembly is installed on the support 32 after the support 32 has been installed within the tank.

As emerges clearly from the foregoing description, thanks to the characteristics indicated, the operations of installation, maintenance and/or replacement of the pump assembly in the tank according to the invention are particularly simple and rapid. The structure of the tank is moreover particularly simplified, also as regards the support of the level-sensor assembly. Finally, the pre-arrangement of a support on which the pump assembly and possibly also the level-sensor assembly can be anchored in a simple and rapid way enables convenient adaptation of said components to tanks that have different structures and conformations.

Of course, without prejudice the principle of the invention, the details of construction and the embodiments may vary widely with respect to what is described and illustrated herein purely by way of example, without thereby departing from the scope of the present invention.

What is claimed is:

1. A tank for a system for supplying liquid fuel, particularly LPG, to the engine of a motor vehicle, comprising a pump assembly set within the tank, including a pump for suctioning the liquid fuel contained within the tank and feeding it to a pipe for supply of the fuel, and an electric motor for actuating the pump, wherein the pump assembly is installed by fast-connection means on a support fixed within the tank, wherein said support defines a seat for receiving the pump assembly and is provided with fast-clamping means for clamping the pump assembly within said seat.

2. The tank according to claim 1, wherein said support is also used for supporting a level-sensor assembly within the tank.

3. The tank according to claim 1, wherein said support comprises one or more bottom surfaces, which define a bottom supporting surface for the pump assembly, one or more vertical walls extending from said bottom surfaces to define the seat of the pump assembly, and one or more top surfaces for containing the pump assembly at the top.

4. The tank according to claim 3, wherein said support has a central vertical wall and two side vertical walls provided with means for hooking an elastic retention member for holding the pump assembly in its seat.

5. The tank according to claim 1, wherein said pump assembly is set within a cylindrical container positioned within the seat of the support.

6. The tank according to claim 4, wherein said central vertical wall has, on the outside, supporting appendages for a level-sensor assembly.

7. The tank according to claim 1, wherein the aforesaid support consists of a single element of stamped and bent metal plate.

* * * * *